PHOTOGRAPHIC TYPE COMPOSITION

Original Filed Sept. 17, 1953 7 Sheets-Sheet 1

INVENTORS
FREDERICK J. HOOVEN &
RICHARD C. O'BRIEN
BY
ATTORNEYS

INVENTORS
FREDERICK J. HOOVEN &
BY RICHARD C. O'BRIEN
Marshall Biebel French & Bugg
ATTORNEYS

PHOTOGRAPHIC TYPE COMPOSITION

Original Filed Sept. 17, 1953 7 Sheets-Sheet 3

INVENTORS
FREDERICK J. HOOVEN &
RICHARD C. O'BRIEN
BY Mechal Biebel French & Bugg
ATTORNEYS INVENTORS
FREDERICK J. HOOVEN &
RICHARD C. O'BRIEN
BY Marshall Biebel French & Bugg
ATTORNEYS

PHOTOGRAPHIC TYPE COMPOSITION

Original Filed Sept. 17, 1953 7 Sheets-Sheet 5

INVENTORS
FREDERICK J. HOOVEN &
RICHARD C. O'BRIEN
BY Marechal Biebel French & Bugg
ATTORNEYS INVENTORS
FREDERICK J. HOOVEN &
RICHARD C. O'BRIEN
BY Marechal Biebel French & Bugg
ATTORNEYS INVENTORS
FREDERICK J. HOOVEN &
RICHARD C. O'BRIEN
BY Marechal Biebel French & Bugg United States Patent Office Re. 25,128
Reissued Feb. 27, 1962

25,128

PHOTOGRAPHIC TYPE COMPOSITION

Frederick J. Hooven, Bloomfield Hills, Mich., and Richard C. O'Brien, Cleveland Heights, Ohio, assignors to Harris-Intertype Corporation, a corporation of Delaware Original No. 2,846,932, dated Aug. 12, 1958, Ser. No. 380,802, Sept. 17, 1953. Application for reissue Feb. 17, 1960, Ser. No. 9,408
25 Claims. (Cl. 95—4.5)

Matter enclosed in heavy brackets [ ] appears in the original patent but forms no part of this reissue specification; matter printed in italics indicates the additions made by reissue.

This invention relates to photographic type composition and more particularly to a system for producing a photographic record of selected composition on a film.

It is a principal object of the invention to provide a device for producing a photographic record of composition material by means of a system which is relatively simple in construction, reliable and rapid in operation, and which has a wide range of flexibility as to selection of size and form of type.

It is also an object to provide a system in which the selection of the line of composition may be made on a keyboard such as an ordinary typewriter keyboard, and in which the line is initially produced in the form of a tape or record strip in which the words are uniformly spaced and with the strip carrying significant control data for effecting justification.

It is a further object to provide a photocomposing system in which characters are selected and arranged in words to form a line of composition with the record being produced initially as a strip in which the words are uniformly spaced and the line is not justified but with the strip carrying the proper information in the form of coded data to enable justification to be carried out.

It is an additional object to provide a novel photocomposing method in which characters are selected and arranged in the form of a line of composition on an unjustified record strip following which entire words are projected onto a final photographic film in justified form.

It is a further object to provide such a system in which the record strip shows the line in exactly the form in which it will appear in the final film except that the words are uniformly spaced and not justified, thereby facilitating proof reading and the making of corrections.

It is another object to provide such a system in which such record strip is projected, a word at a time, on to a final film under the control of the coded data on the strip to produce a properly justified line on the final film.

It is a further object to provide such a photocomposing apparatus in which words on a record strip are separated by word spaces, the spaces being marked, and in which such marks are used together with the coded data to control the projection of entire words from the strip on to the final film with the proper spacing therebetween to accomplish justification.

It is also an object to provide such a system in which a replaceable matrix disk bearing images of the characters also has data associated with each character which is indicative of the width of that character and which is so coded that it can be used in determining the total width of the characters in the line as required to accomplish justification.

It is a still further object to provide such a system in which a punch is used to form a perforation in the record strip and remains in the perforation during the composition of the line, the perforation then serving to establish correct alignment of the strip in the formation of the final page film.

Other objects and advantages of the invention will be apparent from the following description, the accompanying drawings and the appended claims.

In the drawings—

Figure 1:
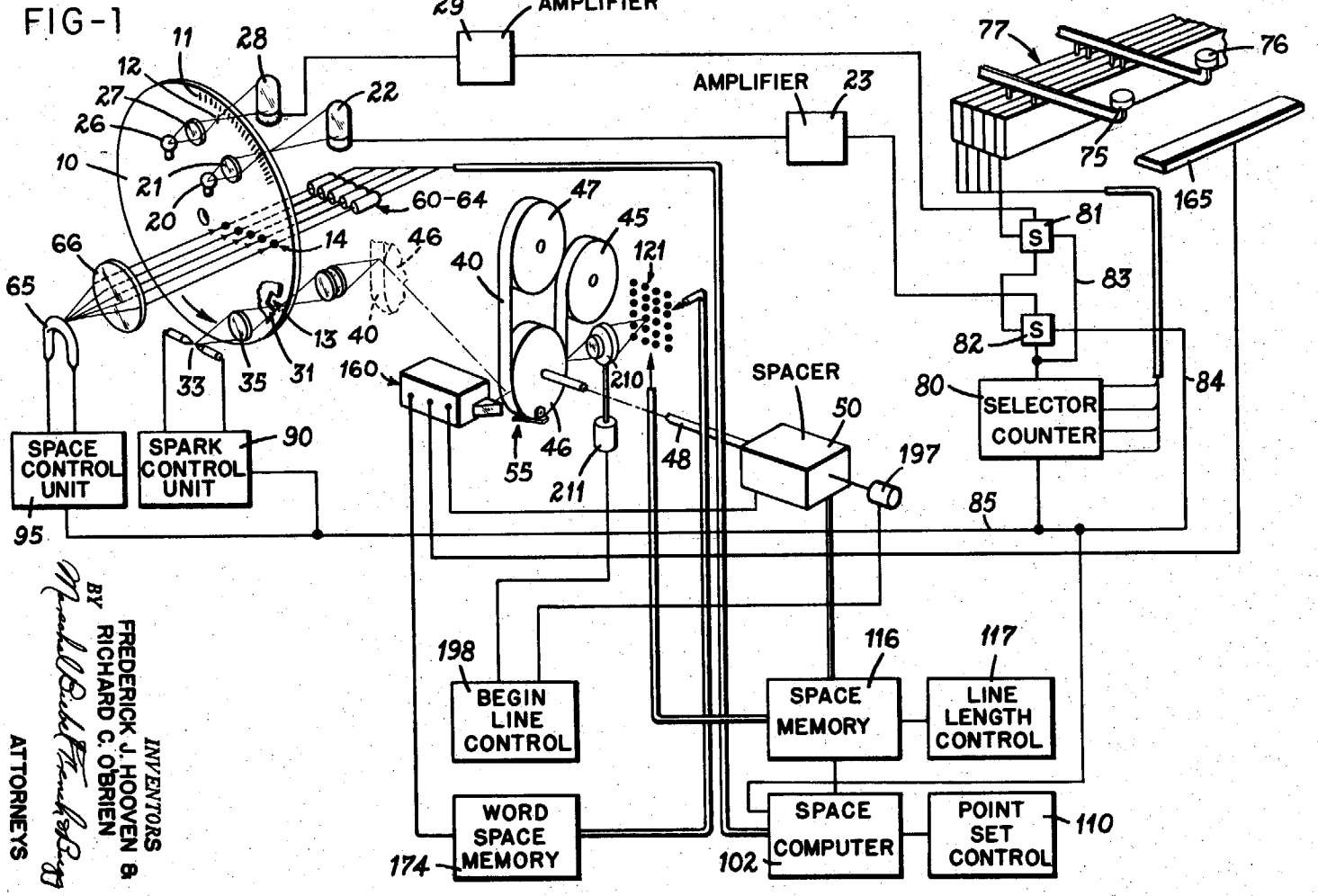
FIG. 1 is a general diagrammatic representation of the part of the system, which embodies the character selection and which results in the production of an unjustified line of composition on a record strip.

The advantages of photographic type composition are widely recognized, especially for use in combination with printing methods which employ plates made from a photographic film. Many methods have been described for the production of such films directly from a keyboard by photographic means. Experience with these methods in practical operation has shown that the production of finished page forms on film involves some difficulties as compared with the more conventional methods using metal type, or line-cast slugs. These difficulties include the matter of correcting or modifying the page forms, for the purpose of correcting errors, incorporating changes, or varying line leading. When using metal type or slugs, individual lines may be removed from the forms and replaced, or leading spaces may be inserted for these purposes, while with a completed film it is necessary to cut out line for correction and to replace them with newly composed lines, which is a precise and time-consuming operation, or to re-photograph the film line-by-line, stopping to insert new matter where required.

In the present invention, lines are composed on a narrow record strip of film or other photosensitive material in unjustified form. In this form the individual words appear in the exact form and relationship of characters that they assume in the final page form so that the proof may be read and the quality of the work inspected before the lines are assembled into forms. This record strip is then re-photographed on to the final film, at which time justification is accomplished by exposing the words, one at a time, and adjusting the space between them in the interval between exposures. Prior to the re-photographing, changes may be accomplished in any desired manner by the cutting and splicing of the narrow record strip, by which means new lines may be inserted and unwanted lines may be removed. At the same time paging may be determined after all the lines are composed, and the leading of the lines in the individual forms may be adjusted before the lines are assembled.

The setting up of lines in unjustified form also allows the greatest possible flexibility in the matter of mixing sizes and styles of type in the same line, or in the setting of special characters and the like.

The present invention shows means for determining the necessary data for the justification of the line, and for photographing it on the record strip in coded form for controlling the process of subsequent adjustment of the word spaces for justification. It also shows means for punching perforations in the record strip, using a punch and die, in which the punch remains in place in the perforation during the process of composition of the line in order to provide exact alignment and to assure proper spacing of the photographed characters, the perforation then serving to establish the exact alignment of the strip during the re-photographing process. The same perforation also serves to establish the alignment of lines during the process of splicing, and since the splice does not occur on that portion of the strip subsequently re-photographed, it can be made rapidly in a simple and durable manner without having any effect on the final page film, thus saving a substantial amount of time in the overall processing.

Both the record strip and the final film as described herein may be made of film such as high contrast photographic film but other photosensitive materials may also be used and are intended to be included wherever applicable. Reference is likewise made to composition consisting of words and word spaces. Word spaces are understood to be those spaces which are subsequently adjusted for justifying purposes during the re-photographing process, and means are provided for the marking of such spaces for the control of justification. Words are then understood to be made up of all matter included between adjacent word spaces, whether characters, symbols or fixed spaces.

Cross reference is made to applicant's copending Patents No. 2,714,842 and No. 2,714,843 both of which show photocomposing systems including certain elements and features which are also incorporated in the present system. Reference is also made to the patent to Harrold and Pritchard No. 2,475,497 which shows a photocomposing system adapted to produce a line of composition in the form of a strip but without including justifying data.

GENERAL DESCRIPTION

Figure 2:
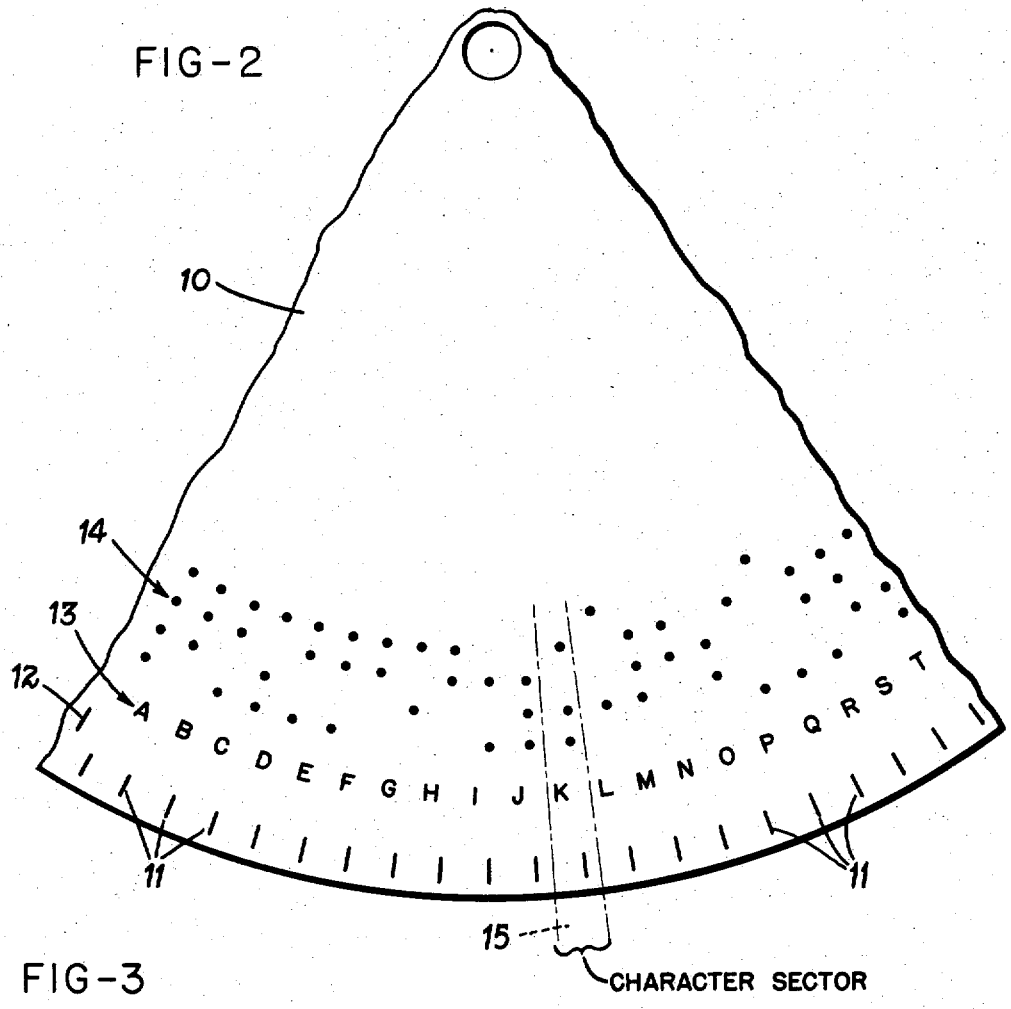
FIG. 2 shows a sector of the matrix disk.

The machine is provided with a continuously rotating disk 10 in the form of a master stencil or the like carrying the characters as transparencies and arranged for continuous relative rotation with respect to a flashing light source of extremely short duration. For purposes of illustration and as a preferred embodiment this disk, a sector of which is shown in FIG. 2, is divided into a number of zones each zones having a characteristic radial distance from the center of the disk. The first or outermost zone contains a plurality of uniformly spaced radial lines 11, one line for each character on the disk, called timing pulses. Progressing inward from the outer circumference of the disk the second zone carries a single tranparent line 12 which will be called the marker pulse. The third zone contains the characters 13 which in the preferred embodiment number 128 equally spaced around the circumference of the zone. The next five zones contain a series of dots 14, each dot corresponding to one digit of a binary number which constitutes a measure of the width of the associated character. Thus in each sector of 1/128 of a circle of the disk hereinafter identified as a character sector, as bounded by the dotted lines 15, FIG. 2, there will be a characteristic pattern of dots which epresses this binary number. A dot in the fourth zone may correspond to a "1" and the absence of a dot may correspond to a "0." Similarly in the 5th, 6th, 7th and 8th zones the presence or absence of a dot will indicate a "1" or a "0" in the corresponding five-place binary number. In this manner any number from 1 to 32 may be represented in association with each character, i.e., in the character sector of that particular character. It will be understood that for convenience of representation the figure is the reverse of the rotating disk as it actually is made in that the disk will have a black background where the figure is white and will have transparencies where the figure has black marks. It will also be understood that in the actual machine the data in each of the different zones associated with a particular character may be and preferably are displaced so that it is not in radial alignment as indicated by the character sector lines in FIG. 2, such angular displacement facilitating the positioning of the parts of the system which function in the selection, code reading, and projection of the selected character.

Figure 3:
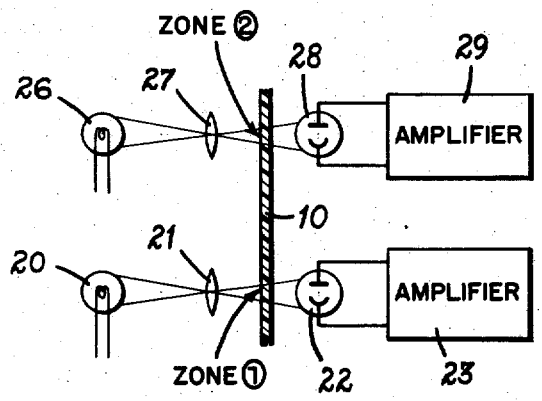
FIG. 3 shows the photoelectric generators which produce the timing pulses and the marker pulse.

Cooperating with the timing pulses in zone 1 is an optical system as shown in FIG. 3. This consists of a lamp 20 having a single straight filament. The image of this filament is focused by lens 21 in such a way that it falls on the surface of the disk 10, a portion of which is shown in cross section. When a timing pulse mark corresponds with the position of this projected image light passes through the transparency and falls on photocell 22 which is connected to amplifier 23, thus generating an electric pulse. Cooperating with the marker pulse in zone 2 is an exactly similar system comprised of lamp 26, lens 27, photocell 28 and amplifier 29.

Figure 4:
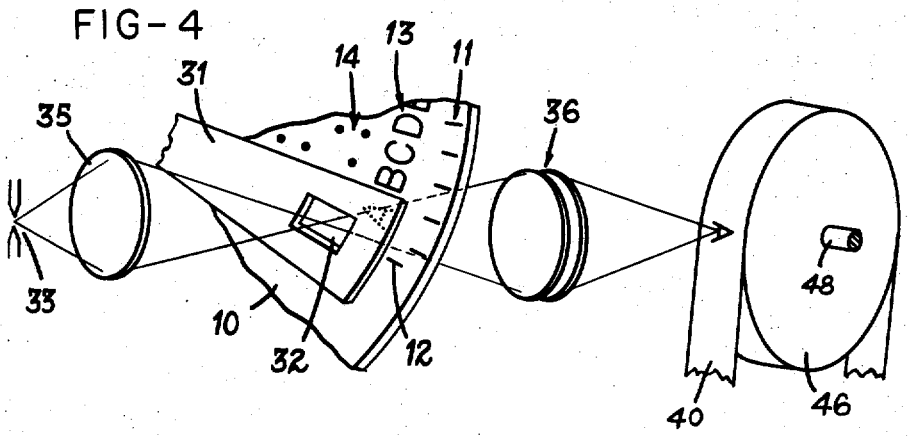
FIG. 4 is a perspective view showing the system used for illuminating and photographing the characters.
Figure 5:
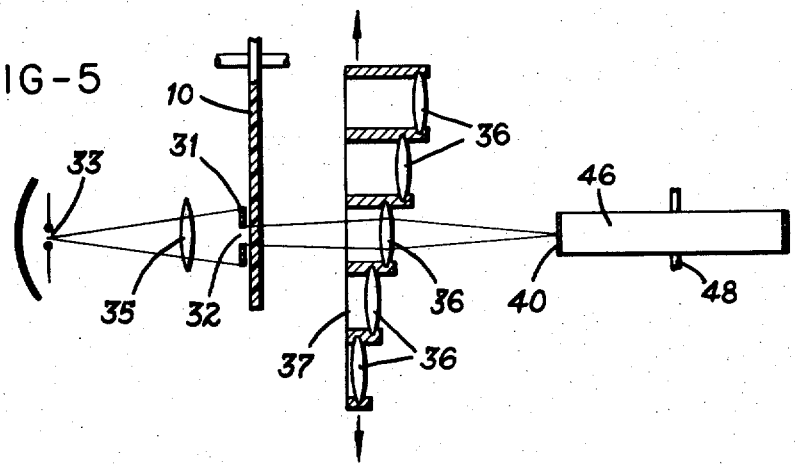
FIG. 5 is a sectional view showing means for producing character images of different point size.

The characters in zone 3 are selectively illuminated and photographed by the system shown in FIG. 4 where a segment of the disk 10 is shown. An opaque mask 31 is held in close proximity of the disk and has in it a rectangular opening 32 corresponding in size with the largest character to be photographed. Along a line *or optical path* through this opening normal to the disk is a controlled light source 33 which may be a spark gap or other type of gas discharge device capable of emitting an intense light for a very brief period, a condensing lens 35, a photographic lens 36 and a strip of light sensitive film 40. The distance from the character transparency to the lens 36 as related to the distance from the lens 36 to record strip 40 and to the focal length of lens 36 is such that the image of the character transparency falls *in a common image plane* on the film or record strip. Lens 36 is one of a series of lenses of different focal length mounted in sliding block 37 which may be moved to bring a selected lens into position to produce images on the film of varying size, thereby providing for varying the point size of the characters as projected on to the record strip 40.

Strip 40 passes from a storage spool 45 on to the drum 46, thence to another storage spool 47 from which it is removed from time to time for developing. Drum 46 is mounted on shaft 48 which is rotated by spacing mechanism 50. After each exposure of a character on strip 40 the strip is advanced *in the image plane* by an amount corresponding to the desired set width of the character just exposed by means to be subsequently described in connection with spacing mechanism 50. During the operation of the machine the strip 40 is maintained in fixed relationship with drum 46 for the duration of the composition of one line of composition. This is accomplished by means of a punch and die set 55 which perforates the strip and is allowed to remain in place in the resulting perforation in strip 40 until completion of that line.

Figure 6:
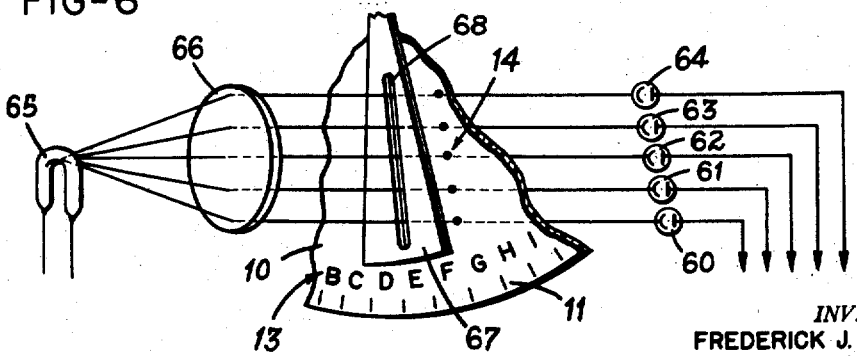
FIG. 6 is a detail showing the space code on the matrix disk with its associated photocell system.

Cooperating with the space code dots in zones 4 to 8 inclusive are five photocells 60 to 64 inclusive (FIG. 6). The gas discharge tube 65 and the condensing lens 66 serve to illuminate an area covering a segment of the character disk. The photocells 60 to 64 inclusive are arranged in a position adjacent the disk and at radial distances from its center of rotation equal to the radii of the respective zones occupied by the space code dots. Between the lens 66 and the disk 10 is a mask 67 having a slit 68 the angular width of which is not greater than that of a character sector of the disk 10 containing one set of space code dots. The lamp 65 is energized at the same instant that the light source 33 is energized in photographing the selected character. At this instant a corresponding pattern of space code dots will be in register with the slit 68 and whichever ones of the photocells 60 to 64 correspond to dots appearing in the slit will be energized.

It will be understood that of the previously described units which cooperate with the various zones of the disk there will be a single timing pulse mark corresponding to each character. Likewise there will be a segment containing space code dots corresponding to each character. Since these marks are not actually in radial alignment with their corresponding characters for reasons of mechanical convenience as already described, it will be seen that the space code which corresponds to a given character will be that group of space code dots which appears in the slit 68 at the same time that the character appears at the opening 32 and that similarly the timing pulse mark which corresponds to a given character will be that mark which coincides with the projected image of the lamp 20 at the same time that the character appears at the opening.

CHARACTER SELECTION

Referring now to FIG. 1, there are shown two typewriter keys 75 and 76 it being understood that there are sufficient other keys not shown to correspond to the desired number of characters to be selected. Cooperating with the keys 75 and 76 is a switch system 77 such as shown in copending Patent No. 2,714,843 connected to a seven-stage binary counter 80 called the Selector Counter. In the manner described more fully in the cited copending application a unique and characteristic number is preset into counter 80 for each selected character upon the actuation of one of the keys 75, 76, etc. If beginning with the position of the marker pulse on the disk and counting positions around the disk to the position of the selected character the selected position will be "N" then the number preset into counter 80 in order to select that character will be 128—N. At the same time that the key is depressed as also described in said copending application a pulse is generated which closes electronic switch 81. The next time the marker pulse 12 energizes photocell 28 a pulse passes through amplifier 29 through switch 81 to close switch 82. The next following timing pulses 11 appearing in photocell 22 and amplified through amplifier 23 then pass through switch 82 into counter 80 where they are added to the count already preset. The first of these pulses through 82 passes through line 83 and serves to open switch 81. Since the count preset into counter 80 is 128—N, after N timing pulses have been counted counter 80 will have reached a full count of 128. This being a seven-stage binary counter the count of 128 constitutes a complete count, the counter will return to zero at this time and emit a pulse. This pulse travels through line 84 and opens switch 82 thus stopping further counting into counter 80. The same pulse traveling through line 85 passes to Spark Control Unit 90 which actuates light source 33 causing the selected character to be photographed and also passes to Space Control Unit 95 causing light source 65 to become illuminated and thereby causing to be energized those photocells of the group 60 to 64 inclusive which correspond to the digit space code associated with the photographed character.

SPACE COMPUTER AND SPACE MEMORY

Figure 8:
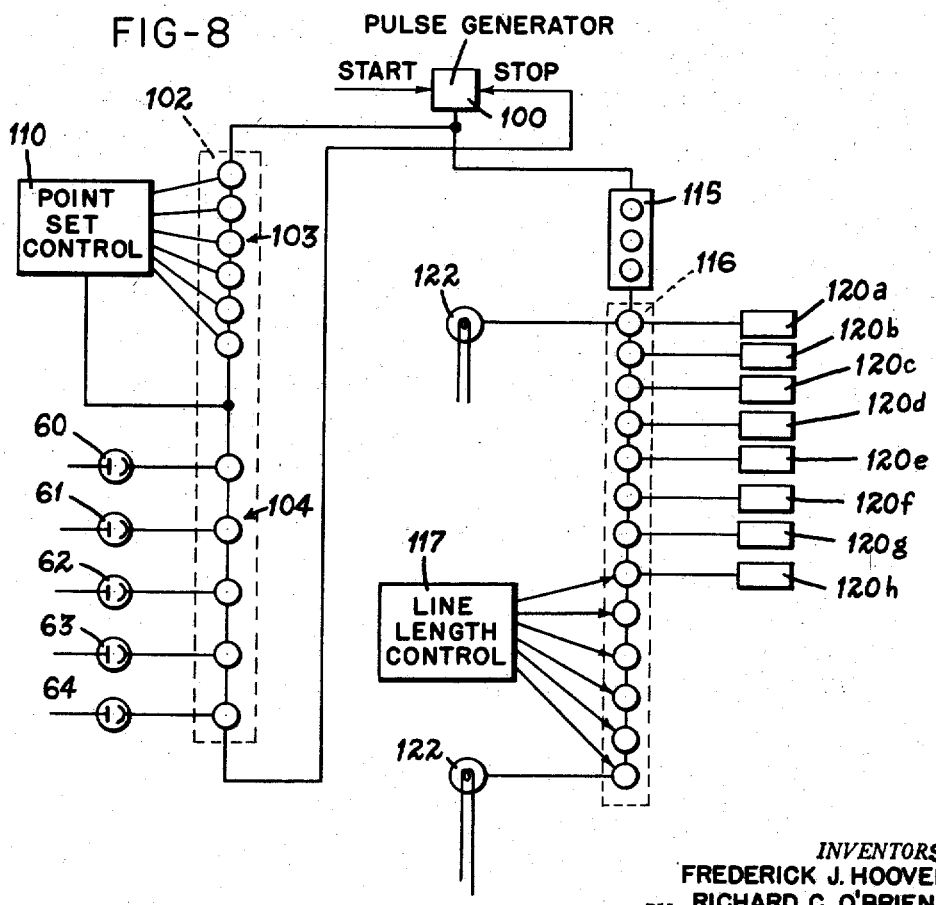
FIG. 8 is a diagrammatic view of the spacing counter.

The space memory 116 and space computer 102 are represented in FIG. 8. There is a pulse generator at 100, adapted to generate electrical pulses at a rate of approximately 100,000 per second, for instance. The output of generator 100 is fed into the input circuit of the space computer 102, which consists of 11 binary stages included within the dotted lines, each stage being represented by one of the circles shown. The first six stages comprise the point set counter 103, the last 5 comprising the space code counter 104.

Connected to the point set counter 103 is the point set control 110 which causes the counter to be preset by its own output pulse so as to emit a pulse each time after it has counted a number of pulses equal to the point set as measured in quarter points. Thus if the operator desires to set type in 8¾ point set the counter will emit a pulse after having counted 35 pulses.

Connected to the space code counter 104 are the 5 photocells 60—64 which are actuated by the space code on the matrix disk, on which are coded the set width of the characters in 16ths of emspace (an emspace is the space having a set width in points equal to the point set).

The space code counter 104 is set by the energizing of the associated photocells 60 to 64 so that it will emit a pulse after having counted a number of pulses equal to the set width of the character in 16ths of an emspace. This being a five digit code it is thus able to represent any number from 1 to 32; correspondingly the space may be anything from $1/16$ of an emspace up to $32/16$, or 2 emspacers.

The space code counter 104 counts the output pulses of the point set counter 103, so that it will give a pulse after the point set counter has received a number of pulses equal to the product of the set width in quarter points and the space code in 16th ems. This product will represent the actual width of the character in 64th points. For example, suppose a character having a set width of $14/16$ emspace is being photographed in 8¾ point set. Each time the point set counter 103 counts 35 it will emit a pulse to the input of the space code counter 104. After 14 such pulses have been emitted the point set counter 103 will have counted 35 pulses 14 times over, or a total of $14 \times 35 = 490$ pulses, and the space code counter 104 will then emit a pulse. The output circuit of the space code counter is connected to the stop circuit of the pulse generator 100. The start circuit of the pulse generator is connected to the output circuit of selector counter 80, which also controls the flashing of the character through light source 33, and the flashing of the space code through light source 65 upon the appearance of a character in the photographing position following the actuation of a character key by the machine operator.

Thus, each time the operator depresses a key and a character is photographed, the pulse generator 100 is caused to emit a number of pulses equal to the number of 64th points occupied by the character on the strip 40, and since $1/64$ of a point is $1/12 \times 64$ picas (there being 12 points in a pica) this number is also the width of the character in $1/768$ parts of a pica.

Such $1/768$ part of a pica is too small a unit to be significant in spacing operations so this number is divided by 6 to give spacing units in terms of $1/128$ parts of a pica and this unit will hence forth be known as a "space unit." A pica is $1/6$ of an inch, so $1/128$ of a pica is $1/768$ of an inch, or approximately 0.0013 inch (1.3 milliinches).

The output of pulse generator 100 is connected to the input of divider counter 115, which is set to emit a pulse after each 6 pulses counted, and will therefore emit a number of pulses equal to the set width of each character in space units. The remainder after each such number is counted remains in the divider counter between successive operations so that the rounding-off error does not accumulate.

The space unit count from counter 115 is fed into the space memory counter 116, consisting of 13 binary stages. Each of the first 8 stages of this counter is connected to corresponding solenoids 120a through 120h of the spacer mechanism, shown generally at 50, while each of the 13 stages is connected to a code lamp of bank 121 as shown at 122 for the first and last stages only. Each solenoid 120 is energized when its associated counter stage reads 0 and deenergized on a reading of 1. Each lamp 122 bears a similar relationship to its associated counter stage.

The 13-stage memory counter 116 will have a full count of $2^{13}$ or 8192 space units, corresponding to a space of 64 picas. At the beginning of the line the last 6 stages of the counter are preset by line length control 117 to a number equal to the complement of the length of the line in picas (64—L where L is the line length in picas), and the first 7 stages of the counter are preset to 0. The code lights, being energized for each 0 count will then read a total count corresponding to the desired line length, this being the complement in space units of the count preset into the counter.

As counts of space units are added to the counter they will be subtracted from the complement reading indicated by the code lamps so that when the selection of the line of composition has been completed, the lamps will indicate the space remaining in the line after all the space units occupied by photographed characters have been subtracted. This is the number which is to be recorded on the film for use subsequently in the justifying operation.

For example, suppose a line length of 40 picas is desired. The counter will be preset to 24 picas (64—40), giving a preset count of 0,110,000,000,000, or in decimal numbers 3072 space units. The code lights will read 1,001,111,111,111 which is 39 picas+127 space units, or 5119 space units. Then suppose that 4500 space units of characters are set into the line. This will be added to the preset count.

| | |
|---|---|
| 0,110,000,000,000 | (3072) |
| 1,000,110,010,100 | (4500) |
| 1,110,110,010,100 | (7572) |

and the lights will read 0,001,001,101,011 (619=5119—4500)

which is the space remaining in the line for justification.

CHARACTER SPACING MECHANISM

Figure 9:
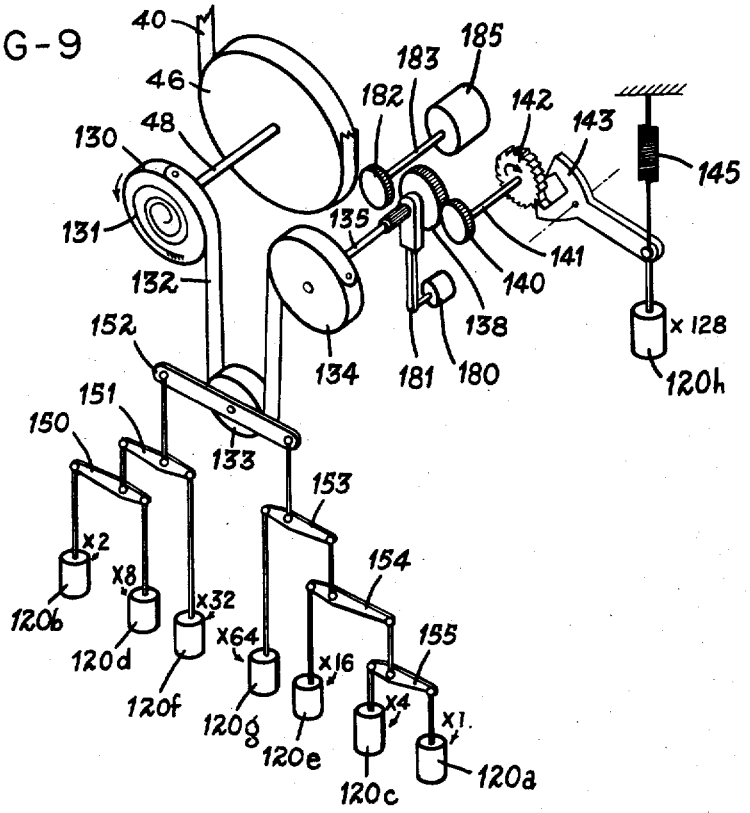
FIG. 9 is a perspective view of the spacer for spacing the characters on the record strip.

The spacer mechanism is shown in FIG. 9. The record strip drum shaft 48 has mounted on it a pulley 130, and spiral spring 131 which urges the assembly in the direction of the arrow. Fastened to pulley 130 is one end of tape 132 which passes over floating pulley 133 to pulley 134, to which its other end is fastened. Pulley 134 is mounted on shaft 135 with gear 138 which engages pinion 140, which is carried on shaft 141 also carrying ratchet wheel 142. Wheel 142 engages the escapement pawl 143 and is normally restrained from rotation thereby. The tension of spring 131 passes through tape 132 and the associated system to cause ratchet wheel 142 to tend to turn in the direction of the arrow. Solenoid 120h exerts a downward pull on escapement arm 143 when energized, this pull being opposed by spring 145 which pulls the arm 143 up again when solenoid 120h is deenergized. Solenoid 120h is connected to the 8th stage of the space counter, which counts in units of 128 space units, or 1 pica. Each time solenoid 120h is caused to change from the energized to the deenergized state or vice versa the escapement pawl will permit wheel 142 to rotate through ½ a tooth angle, and the proportions of the various parts are so chosen that this motion results in the movement of the record strip 40 through 1 pica.

The remaining 7 solenoids, 120a to 120g inclusive, are connected to the first 7 stages of the space counter 116 in respective order. Each exerts a downward pull when energized, this pull being resisted through the series of proportioning links 150–155 inclusive by the upward pull of tape 132 exterted on pulley 133 which is carried on arm 152.

Each solenoid is provided with an adjustable stop, not shown, which permits its armature to be withdrawn through a predetermined distance when deenergized, and when each armature is deenergized the pulley 133 is permitted to move upward, thus paying out an amount of tape, and permitting a corresponding amount of spacing movement of drum 46. These various predetermined distances are adjusted so that each solenoid, when deenergized, permits a spacing movement of that number of space units equal to that counted by its associated space counter stage, these numbers being shown on the various solenoids in FIG. 9. When each solenoid is reenergized it pulls the pulley 133 down through a similar distance causing a reverse spacing movement of the film drum 46. It will be seen that the upward movement of pulley 133 will be the sum of all the separate movements of the various solenoids when deenergized.

Thus it may be seen that the ×128 solenoid 120h accumulates an additional space each time the associated counter stage receives a count, but that the smaller increments move only forward one space and then back again on successive counts. Since the latter are energized on the 0 count of the counter stage and deenergized on the 1 count, it will be seen that the total space paid out by the 7 smaller spacers will be the sum of those digits whose count is 1, and can never exceed 127 space units, the sum of the first 7 digits of the counter. Thus the total space movement of the strip will be the sum of the total counts of the 8th (×128) stage plus the current digits of the first 7 stages. This will be seen to be equal to the sum of all the counts impressed on the space counter, and when any number of space units is added, the strip will be spaced forward an additional amount equal to that number.

For example, suppose the space counter reads initially as in the above example 0,110,000,000,000 and all solenoids are energized, so the space position of the film is also 0. Then suppose 95 space units are added

| | |
|---|---|
| 0,110,000,000,000 | (3072) |
| 1,011,111 | ( 95) |
| 0,110,001,011,111 | (3167) |

so the 1st, 2nd, 3rd, 4th, 5th and 7th solenoids will be deenergized, allowing a space movement of 1
+ 2
+ 4
+ 8
+16
+64
=95 space units then let 45 more space units be added:

| | |
|---|---|
| 0,110,001,011,111 | (3167) |
| 101,101 | ( 45) |
| 0,110,010,001,100 | (3212) |

now the 3rd, 4th and 8th stages are deenergized giving a total of:

$$\begin{array}{r} 4 \\ +\ 8 \\ +128 \\ \hline =140=95+45 \end{array}$$

If now 116 additional space units be added, the total will be

| | |
|---|---|
| 0,110,010,001,100 | (3212) |
| 1,110,100 | ( 116) |
| 0,110,100,000,000 | (3328) |

Now no solenoids are deenergized, but in reenergizing, the 8th stage solenoid has paid out another 128 space units, giving a total of 256 units (or 2 picas), accumulated by the ratchet spacer (256=140+116). Since all other solenoids are energized the total space of the 1st seven stages is 0.

RECORDING OF WORD SPACES

Figure 7:
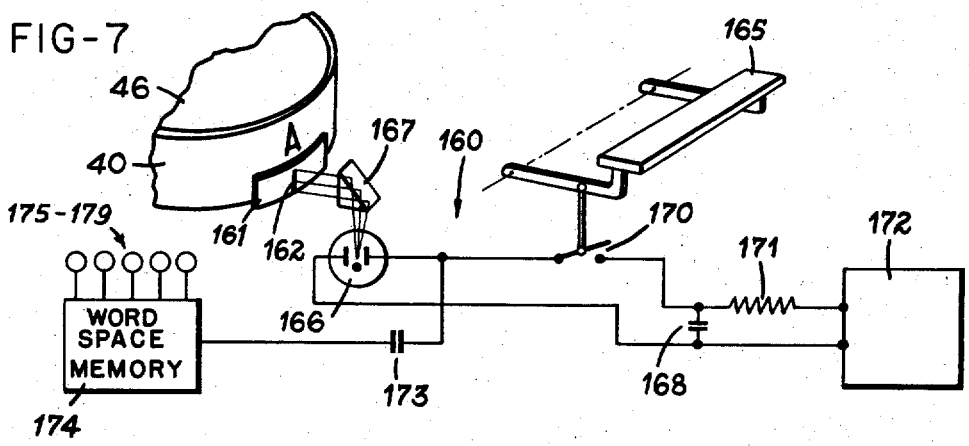
FIG. 7 is a schematic view showing the means used to produce the word space mark on the record strip.

FIG. 7 shows the detail of word space recorder indictated generally at 160, FIG. 1, whereby the word space code is photographed on the record strip. A segment of record strip drum 46 is shown, and a section of record strip 40 is also shown, the letter A showing the location of the photographed character at the instant of being photographed. Such means is indicated generally at 160, and includes mask 161, masking a portion of the strip below the line normally occupied by the photographed characters, the mask having slot 162 therein whose position in angular relation to drum 46 is coincident with that of the character being photographed. When the operator wishes to indicate a word space, he operates the word space bar 165, and gas discharge lamp 166 is caused to light momentarily, thus illuminating slot 162 through prism 167 and exposing a similarly shaped area on strip 40. The illumination is caused by the discharge of condenser 168 through lamp 166 by means of a circuit completed through switch 170, actuated from word space bar 165. Condenser 168 is recharged, after the switch is opened, through resistor 171 from power supply 172.

The pulse which results from the flashing of lamp 166 is fed through condenser 173 into Word Space Memory 174, which is a five-stage binary counter. Each stage of this counter is provided with a display lamp (175–179) forming a part of data display 121, whereby the total number of word spaces is recorded on the strip at the end of each line. Similarly, a pulse is communicated to spacer 50, whereby solenoid 120h is actuated to cause a space to be inserted without changing the count recorded by space memory counter 116.

OPERATIONS PERFORMED AT END OF LINE

When the operator has finished a line he actuates the "Begin Line Control" 198, FIG. 1, thereby initiating a sequence of operations by means of which the justification data is recorded on the strip, and the system is made ready for the composition of a new line of composition.

There are shown the gear wheel 138, engaged by the pinion 140, which as shown in FIG. 9 drives the escapement controlling the movement of the spacing system. Solenoid 180 is adapted to disengage gear 138 from its engagement with pinion 140, for which purpose gear 138 is splined and slidably mounted on shaft 135, and held engaged by shifting fork 181, coupled to solenoid 180. It is noted that the number of teeth on pinion 140 is equal to the number of teeth on escape wheel 142, so that disengagement and subsequent reengagement of pinion 140 will not cause any alteration in the fine measurement of the spacing positions of the spacing system. In other words, the disengagement of pinion 140, followed by relative movement of gear 138 and reengagement in a different relationship will result in a new spacing alignment of the spacer which is modified by some integral number of picas. When gear 138 is disengaged from pinion 140 it is caused to engage pinion 182 which is mounted on shaft 183, to which is connected rewind motor 185, and is adapted to be engaged with gear 138 by the action of solenoid 180, operating through shifting fork 181.

Figure 10:
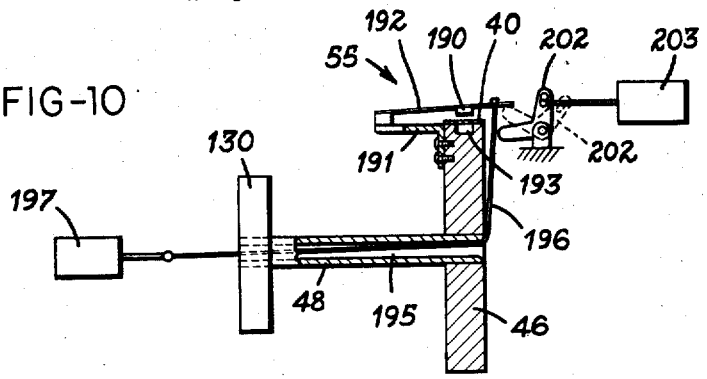
FIG. 10 is a view in section through the drum which controls the setting of the record strip showing the relationship of the punch and die therewith.

FIG. 10 illustrates the means for operating punch and die set 55 and for clamping of strip 40 during the rewind operation. There is shown in cross section, shaft 48, carrying record strip drum 46, on which is mounted a punch 190, carried on bracket 191 by leaf spring 192. Die 193 is integrally formed with the record drum 46, and is aligned with punch 190. Shaft 48 has a central axial hole 195, through which passes flexible cable 196, connected to solenoid 197. Cable 196 passes through hole 195, bending over the smoothed end of the hole to engage the arm 192 of punch 190, so that when solenoid 197 is energized, punch 190 enters die 193.. Strip 40 being in its place relative to drum 46 will then be pierced by punch 55 to form the locating perforation 200. Lever 202 is fixedly mounted at the extreme of travel of the punch 190 in such a position that when the solenoid 203 is energized the lever engages the spring arm 192 of punch 190, thus stripping it from the perforation in the film, in which position it remains because of the tension of spring arm 192 until solenoid 197 is energized to punch a new hole.

Figure 11:
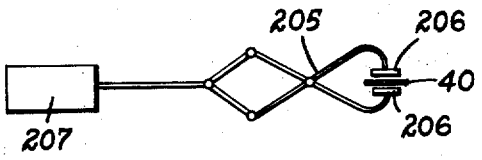
FIG. 11 is a schematic view showing means for clamping the record strip during the rewind operation.

FIG. 11 shows clamp 205, which is of the well-known ice-tongs configuration. It carries smooth jaws 206, between which strip 40 moves after leaving drum 46, and before reaching take-up spool 47. Tongs 205 are actuated by solenoid 207 and when the solenoid is energized the strip 40 is clamped between the jaws 206 and restrained from movement.

During the operation of the machine these various parts are actuated in predetermined sequence as described below by the "Begin Line Control" (198, FIG. 1). The details are not shown by which this operation and sequence are controlled, but such sequential operation is common in the operation of automatic machinery and is understood by those skilled in the engineering art.

At the beginning of a line solenoid 197 is energized and remains energized throughout the composition of a complete line of type matter. Thus punch and die set 55 is caused to form a perforation in strip 40, and the punch 190 remains in the perforation and in the die 193 during the composition of a line, thus exactly maintaining the fixed relationship of strip 40 and drum 46 throughout this period, and thus making assured exact spacing relationships of the various letters and at the same time providing a perforation which can serve as a key for accurately aligning the record strip during subsequent operations of rephotographing of the individual words into a justified line.

When the operation of the "Begin Line Control" 198 at the end of a line of composition, the following sequence is initiated: Solenoid 180 is energized, thus engaging rewind motor 185 with the spacer, and disengaging the spaced escapement. Motor 185 remains unenergized, so that the whole system is allowed to move forward under the force of spring 131 (FIG. 9) to a stop, marking the limit of the forward travel of the system. During this period of forward travel, motor 185 may be suitably energized to form an electric brake, so as to prevent a too-rapid movement of the system under the force of the spring 131.

When the system moves to the forward stop, that unexposed portion of the strip between the punch and die set 55 and the first letter of the line is then in focus with lens 210 and display unit 121. At this time by means of solenoid 211 coupled to a shutter mounted on lens 210 (FIG. 1), the code display 121 is photographed in strip 40, thus marking on it the necessary information to enable the line to be subsequently justified. At this same position solenoid 207 is energized, thus clamping the record strip, solenoid 197 is deenergized, thus releasing punch 190, and solenoid 203 is momentarily energized, thus stripping punch 190 from the perforation in strip 40. At this time rewind motor 185 is energized, rewinding drum 46 to the backward stop, corresponding with the beginning of the line position. When the system reaches this position, motor 185 is deenergized, solenoid 180 is deenergized, thus reengaging pinion 140, and disengaging pinion 182. During this rewinding process, strip 40 has remained clamped and does not therefore move backward with drum 46. For this reason a fresh length of record strip will be at this time in the operating position. At this time solenoid 197 is energized, thus punching a new perforation, and solenoid 207 is deenergized, unclamping the strip and leaving the system in condition to photograph a new line of matter.

DESCRIPTION OF RECORD STRIP

Figure 12:
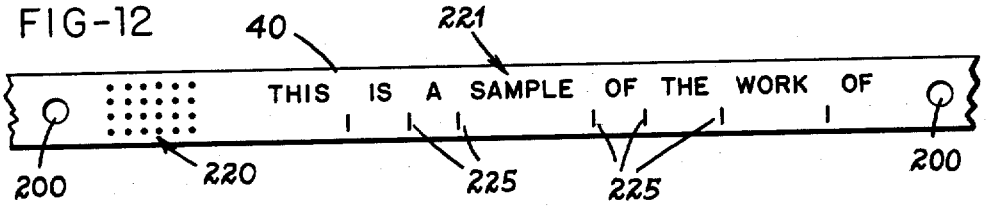
FIG. 12 shows a portion of the completed record strip carrying a typical line of composition together with the proper coded justifying data.

FIG. 12 shows the final result of the photographing of an unjustified line of text on the record strip according to the process described above. At 200 is the locating perforation punched in the strip by the punch and die set 55. At 220 is the representation of the various space codes displayed on indicator 121 (FIG. 1). For convenience of representation there are shown twenty-four dots in the group whereas it should be understood that in an actual line of text only those dots would actually be present which correspond to an illuminated code digit in the display. Each word is shown at 221 as it would appear in the final justified text, that is, with the final spacing relationship between the letters thereof, but the space between words is an arbitrarily chosen uniform value. The characteristic mark 225 indicating the location of the word space is below the line occupied by the photographed letters.

PROJECTION OF ENTIRE WORDS

Figure 13:
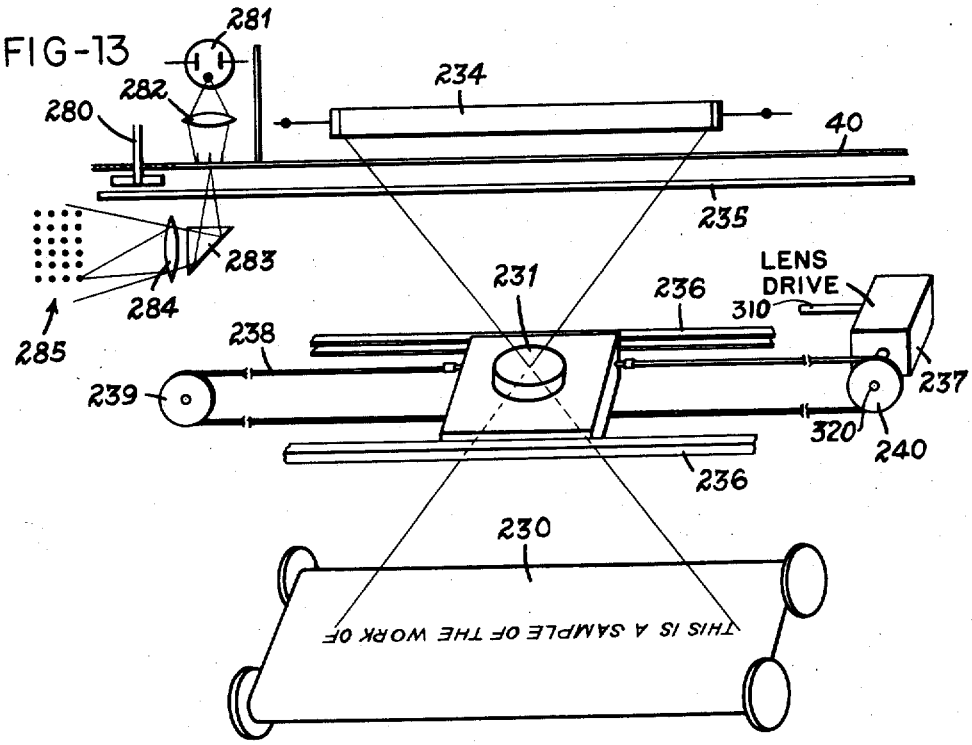
FIG. 13 is a diagrammatic view of the part of the system which provides for projecting entire words from the record strip on to the final film in properly spaced and justified relation.

FIG. 13 shows in diagrammatic form the means whereby the words photographed on strip 40 are rephotographed on a film in justified form. Justification is accomplished by rephotographing one word at a time from the strip 40 on to the film 230 which carries the completed page text (these will be known henceforth simply as the strip and the film). Between the photographing of successive words the space between words as projected on the film is adjusted to effect the required justification by means hereafter described. The lens 231 is designed and positioned so that the image of the word from strip 40 is projected on to the film 230. Flash lamp 234 is designed to illuminate the complete length of a line on the strip. Shutters which move in the plane 235 adjacent the strip and between the strip and the lens 231 are arranged to uncover one word at a time as described below in detail. Lens 231 is caused to move along rails 236 by lens drive 237 operating through tape 238 carried by pulleys 239 and 240 in order to adjust the spacing between successive photographed words, rails 236 being disposed parallel to strip 40. It may be understood that while the position of the image of any given word on strip 40 as projected on film 230 may be altered by movement of lens 231, such alteration may alternatively be accomplished by relative movement of the strip and the film or any combination of such relative movement as may be dictated by convenience.

Figure 14:
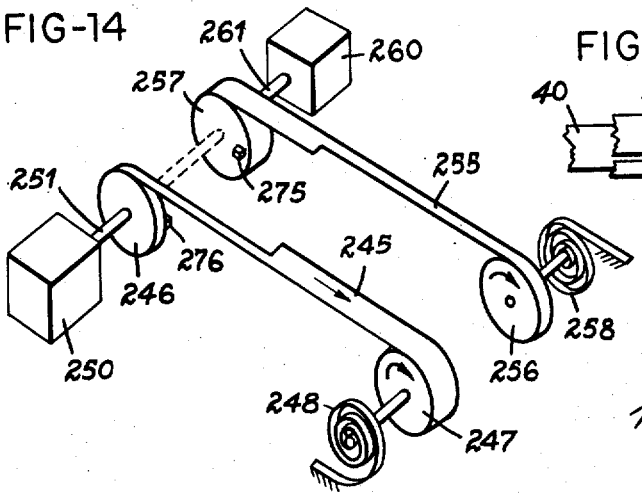
FIG. 14 is an exploded view of the shutter system of the mechanism shown in FIG. 13.

FIG. 14 shows the arrangement of the shutters which are used to uncover the single words photographed on the strip. The shutter 245 consists of a thin opaque ribbon which may be either of metal or plastic material, which as shown is wider on its forward than on its rearward end. This ribbon is wound around two drums 246 and 247. The drum 247 is connected to spring 248 which tends to rotate drum 247 in a clockwise direction as shown by the arrow and therefore tends to move shutter 245 from left to right. This tendency is resisted by an electromagnetic brake shown at 250 on the shaft 251 of drum 246. Thus while the brake 250 is energized, thereby holding drum 246 stationary, shutter 245 is maintained in tension and in fixed longitudinal position by the force on spring 248. When brake 250 is deenergized both drums are permitted to rotate and shutter 245 is permitted to move in the direction of the arrows. Shutter 245 is located with respect to strip 40 so that the wide part of the shutter occupies the space between the strip 40 and the lens 231, thus preventing the projection of the image on strip 40. The narrow part of shutter 245 is removed from this region and does not obscure the image as seen by the lens.

Figure 15:
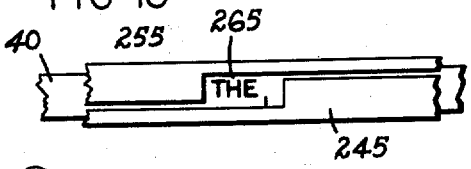
FIG. 15 illustrates the relationship of the shutter system and the record strip during projection of a word.

Shutter 255 is similarly mounted on drums 256 and 257 kept in tension by spring 258 and electromagnetic brake 260 on shaft 261 of drum 257. Shutter 255 has the difference, however, that it is narrow at the forward portion and wide on the rearward portion, the wide part obscuring the strip as above described. While the general view of FIG. 14 is shown in exploded fashion for convenience of representation, the actual relationship of the two shutters is as shown in plan in FIG. 15, in which the two shutters are shown in such a position as to form a window 265 which reveals one word at a time on strip 40.

Figure 16:
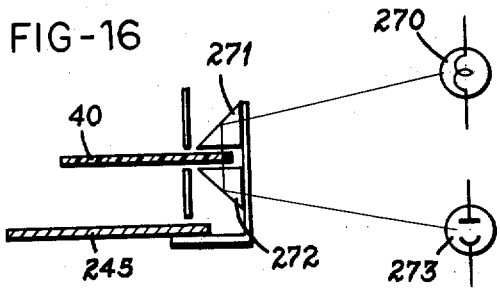
FIG. 16 is the detail of the shutter control system.

Carried with shutter 245 is the photocell control unit shown in FIG. 16. This consists of lamp 270, prisms 271 and 272, and photocell 273. Film strip 40 is interposed between the prisms 271 and 272 so that it normally interrupts the passage of light from lamp 270 to photocell 273. However, as shutter 245 is moved along the strip 40, the prisms 271 and 272 move into register with one of the word space marks 225, at which time the light path from lamp 270 to photocell 273 is completed, thus causing the energizing of photocell 273 which is caused to energize electromagnetic brake 250. The relative locations of the prisms 271, 272, the shutter 255 and the word space marks 225 are so chosen that when this occurs the shutter 245 will come to rest in the middle of a word space.

Referring to FIG. 14 there are shown two stop blocks 275 and 276 fixed respectively to drums 257 and 246. The drums 246 and 257, although shown in exploded form, are actually mounted concentrically and in directly adjacent positions, so that the blocks 275 and 276 cooperate to prevent drum 257 from overrunning drum 246. The positions of the blocks on the drums are so chosen with respect to the locations of the shutters 245 and 255 that the blocks come into contact with one another in that position where the window 265 between shutters 245 and 255 is closed. Thus, if brake 260 be released while brake 250 remains energized, shutter 255 will be permitted to move forward until the window is closed, at which time the blocks 275 and 276 will touch, and will prevent further forward motion of shutter 255.

The sequence of operation of shutters 245 and 255 may now be described. Thus at the beginning of a line, both shutters will be at the left hand extremity of their travel and the window between them will be closed. Brake 250 is then deenergized, allowing shutter 245 to move forward to the end of the first word, at which point it stops by reenergizing of brake 250, as already described. After the first word is photographed, brake 260 is deenergized allowing shutter 255 to move forward, thus closing the window. At this point brake 260 is reenergized and brake 250 is deenergized to repeat the process.

Referring again to FIG. 13 there is shown the means whereby the coded numbers appearing on display 121 as photographed on strip 40 are registered for the purpose of effecting justification. Strip 40 is maintained in a predetermined position by locking pin 280 which fits into the perforation 200. Flash lamp 281 and condensing lens 282 are arranged to illuminate the coded area 220 on strip 40. The image at this area is projected through prism 283 and photographic lens 284 on to a bank of photocells 285 including one photocell in corresponding position to each of the code digits shown in 121 (FIG. 1).

Prior to the process of photographing each line, flash lamp 281 is flashed. There will be a transparent dot in the code area 220 corresponding to each one of the code lamps of display 121 which happen to be illuminated at the time of the photographing of the line of text on the strip, as described in connection with the process. Since there is a photocell in bank 285 corresponding to each one of the lamps in display 121 it will be seen that for each illuminated lamp originally photographed there will be a corresponding photocell energized at this time.

Figure 18:
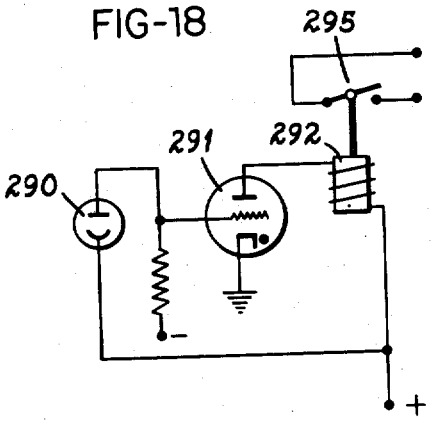
FIG. 18 is an element of the counter reset system.

Referring to FIG. 18 there is shown a photocell 290, a thyratron 291, and a relay 292 having contacts 295. It will be seen that when photocell 290 is energized by incident light, current will be caused to flow through relay coil 292, thus closing contacts 295 and that the circuit will remain in this condition until the current source is interrupted even after photocell 290 is no longer energized. Each of the photocells in bank 285 is connected in a circuit similar to that shown.

The contacts 295 are connected to the individual stages of the various counters to control their resetting according to the detailed circuits for electronic counters and means for causing such counters to be reset in such a way that they may be caused to emit an electrical pulse after having counted any predetermined number of pulses have been described in said previously filed applications and reference is made thereto for a complete description.

The energizing of photocell 273, previously described in connection with the shutter control system, when energized as described also initiates the sequence of justification operations which begins by the energizing of the lens drive 237. This causes lens 231 to move in such a way as to adjust the word space to the desired width to obtain justification. When this movement has reached the exact amount, the word is photographed by means of the flashing of lamp 234. Lens drive 237 is then deenergized and the shutter sequence is reinstituted. The means whereby these operations are controlled in sequence are indicated generally in FIG. 17, "Justifying Sequence Control" 296. This control is not described in detail, but such sequential operation controls are well known and understood.

Figure 17:
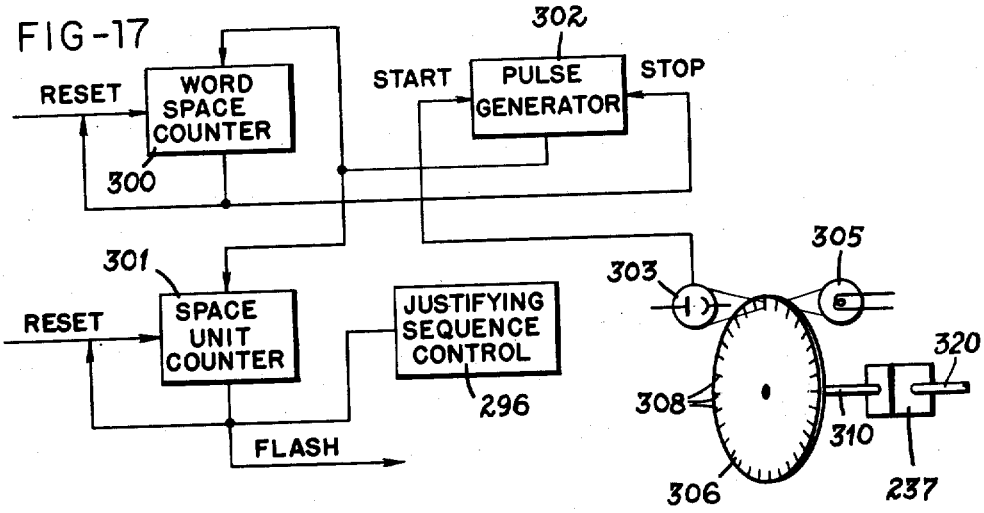
FIG. 17 is a diagrammatic view of the justifying computer.

The process of computing and adjusting the justified word space may now be described. In FIG. 17 there is shown at 300 an electronic counter called "Word Space Counter" which is caused by the coding mechanism above described, to emit a pulse each time it has counted a number of pulses equal to the number of word spaces in a given line of text. Similarly there is shown at 301 an electronic counter called "Space Unit Counter" that is caused to emit a pulse after having counted a number of pulses equal to the number of space units remaining in the line to be divided into word spaces.

Connected to the input circuits of both counters is a pulse generator 302 which is caused to start generating pulses upon the energizing of photocell 303 and it is caused to stop generating pulses upon the emission of a pulse from counter 300, that is, after it has counted a number of pulses equal to the number of word spaces. adapted to energize photocell 303 is lamp 305. Disk 306, having radial transparent slits 308, is mounted on shaft 310, and the relation arrangement of the disk, lamp, and photocell is similar to that previously described in connection with FIG. 3, with disk 10, slits 11, lamp 20 and photocell 22. Thus each time one of the slits in disk 306 passes through the described position, pulse generator 302 will be started and will emit a number of pulses equal to the number of word spaces in the line and then be stopped as described. Shaft 310 is directly connected with lens drive 237 and rotates at such a ratio with the lens drive 237 (FIG. 13) as to cause one such event to occur each time lens 237 moves through a distance such as to cause a movement through one space unit of the word image projected on film 230.

Meanwhile the count of the number of pulses is being cumulated into the Space Unit Counter 301. When the total number of pulses counted into counter 301 becomes equal to the number of space units remaining in the line, lens 231 will have moved through a distance corresponding to one justified word space. At this instant counter 300 will emit a pulse which will cause flash lamp 234 to flash, thus photographing the word in the desired position. The same pulse initiates operation of the justifying Sequence Control 296 by means of which at this instant the lens drive unit is stopped and magnetic brake 260 controlling shutter 255 is deenergized, allowing shutter 255 to close the window as above described. Magnetic brake 250 is then briefly deenergized allowing shutter 245 to move forward, thus uncovering the following word as above described, at which time the lens drive unit is restarted and the process of justification repeated.

Figure 19:
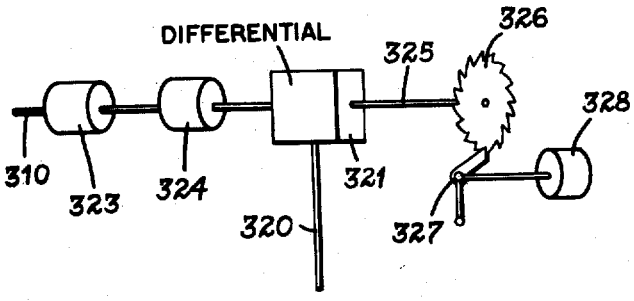
FIG. 19 is a diagrammatic showing of the lens drive.

Lens drive 237 as shown in FIG. 19 incorporates output shaft 320 which is connected to the drive system for lens 231. Shaft 320 is driven by differential 321, through which it is driven by drive shaft 310, carrying drive motor 323 and electric brake 324. Shaft 310 also drives disk 306 (FIG. 17). Shaft 320 is also driven through differential 321 by shaft 325 on which is mounted ratchet 326, actuated through pawl 327 by solenoid 328. Upon the commencement of the justification operation the motor 323 is energized, to drive the lens as described. Solenoid 328 is also energized under control of the Justifying Sequence Control, causing pawl 327 to step wheel 326 one step. This causes a counter rotation of shaft 320 such as to cause lens 231 to move backward through a space, cancelling out the arbitrary fixed word space present on the record strip, allowing the justifying mechanism to insert a new space adjusted to the proper length for justification as described.

In this way it will be seen that the system controls the relative advance of the lens 231 with respect to the film as needed to locate each word with the proper amount of word space to bring about justification of the entire line. Further details of this justifying operation, and a complete analysis of the principle of the system is contained in said copending applications above referred to. Suitable means are also provided for advancing the film 230 at the end of each line to accomplish leading.

The final product produced by the present system is in the form of a film, or other photosensitive record, on which the lines appear in justified form. The film may run as a continuous unit, or may be marked or cut into lengths corresponding to pages, by any suitable means. In such form it is available for use in lithographing or such other process of reproduction as may be desired.

While the method herein described, and the form of apparatus for carrying this method into effect, constitutes a preferred embodiment of the invention, it is to be understood that the invention is not limited to this precise method and form of apparatus, and that changes may be made in either without departing from the scope of the invention which is defined in the appended claims.

What is claimed is:

1. A photocomposing apparatus for producing a photographic image of a justified line of composition comprising a record strip and a film, means for reproducing on said record strip selected characters in groups forming words separated by uniform word spaces to form an unjustified readable line of composition suitable for photographic reproduction, means for counting the number of said work spaces contained in said line, means for measuring the combined width in space units of the words in said line, means for subtracting said combined width from the desired width of a justified line of composition leaving a difference, means for dividing said difference by said number of word spaces to determine the width of a justified word space, means for recording on said record strip data for justifying said line of composition, a first movable shutter adapted to cover portions of said record strip, a second movable shutter adapted to cover other portions of said record strip, means for intermittently moving said first shutter relative to said record strip to uncover successively each word on said record strip, means for intermittently moving said second shutter relative to said record strip to cover up after an interval each word thus uncovered, means for projecting a word image of each uncovered word from said record strip onto film during said interval, and means controlled by said recorded data for adjusting the relative positions of said record strip, said film and said projecting means for regulating the spacing between said word images to create a justified line of composition on said film.

2. A photocomposing apparatus for producing a photographic image of a justified line of composition comprising a record strip and a film, means for reproducing on said record strip selected characters in groups forming words separated by uniform word spaces to form an unjustified readable line of composition suitable for photographic reproduction, means for counting the number of said word spaces contained in said line, means for placing a mark on said strip at the location of each said word space, means for measuring the combined width in space units of the words in said line, means for subtracting said combined width from the desired width of a justified line of composition leaving a difference, means for dividing said difference by said number of word spaces to determine the width of a justified word space, means for recording on said record strip data for justifying said line of composition, a first movable shutter adapted to cover said record strip, a second movable shutter adapted to cover said record strip, means controlled by said location marks for moving said first shutter relative to said record strip to uncover successively each word on said record strip, means also controlled by said location marks for moving said second shutter relative to record strip to cover up after an interval each word thus uncovered, means for projecting a word image of each uncovered word from said record strip onto said film during said interval, means controlled by said recorded data for adjusting the relative advance of said word images relative to said film to create a justified line of composition.

3. A photocomposing apparatus for producing a photographic image of a justified line of composition comprising a record strip and a film, means for reproducing on said record strip selected characters in groups forming words separated by uniform word spaces to form an unjustified readable line of composition suitable for photographic reproduction, means for counting the number of said word spaces contained in said line, means for measuring the combined width in space units of the words in said line, means for subtracting said combined width from the desired width of a justified line of composition leaving a difference, means for dividing said difference by said number of word spaces to determine the width of a justified word space, means for recording on said record strip data for justifying said line of composition, shutter means adapted to cover all except a single word on said record strip, means for intermittently moving said shutter means relative to said record strip to uncover successively each word on said record strip, means for projecting a word image of each uncovered word from said record strip onto said film, means controlled by said recorded data for adjusting the relative advance of said word images relative to said film for adjusting the spacing between said word images to create a justified line of composition.

4. A photocomposing apparatus for producing a photographic image of a justified line of composition comprising a record strip and a film, means for reproducing on said record strip selected characters in groups forming words separated by uniform word spaces to form an unjustified readable line of composition suitable for photographic reproduction, means for counting the number of said word spaces contained in said line, means for placing a mark on said strip at the location of each said word space, means for measuring the combined width of the words in said line, means for subtracting said combined width from the desired width of a justified line of composition leaving a difference, means for dividing said difference by said number of word spaces to determine the width of a justified word space, means for recording on said record strip data for justifying said line of composition, shutter means adapted to cover all except a single word on said record strip, means controlled by said location marks for intermittently moving said shutter means relative to said record strip to uncover successively each word on said record strip, means controlled by said location marks for intermittently moving said shutter means relative to said film to cover up each word thus uncovered, means for projecting a word image of each uncovered word from said record strip onto said film, means controlled by said recorded data for adjusting the relative advance of said word images relative to said film for adjusting the spacing between said word images to create a justified line of composition.

5. A photocomposing apparatus for producing a photographic image of a justified line of composition comprising a record strip and a film, means for reproducing on said record strip selected characters in groups forming words separated by uniform word spaces to form an unjustified readable line of composition suitable for photographic reproduction, means for counting the number of said word spaces contained in said line, means for placing a mark on said strip at the location of each said word space, means for measuring the combined width of the words in said line, means for subtracting said combined width from the desired width of a justified line of composition leaving a difference, means for dividing said difference by said number of word spaces to determine the width of a justified word space, means for recording on said record strip data for justifying said line of composition, shutter means adapted to cover all except a single word on said record strip, means controlled by said location marks for intermittently moving said shutter means relative to said record strip to uncover successively each word on said record strip, means controlled by said location marks for intermittently moving said shutter means relative to said film to cover up after an interval each word thus uncovered, means for projecting a word image of each uncovered word from said record strip onto said film during said interval, means controlled by said recorded data for adjusting the relative positions of said record strip, said film and said projecting means for adjusting the spacing between said word images to create a justified line of composition.

6. A photocomposing apparatus for producing a justified line of composition on a light sensitive film from an unjustified line on a record strip containing readable word images suitable for photographic reproduction in association with recorded justifying data and word space marks comprising means responsive to the location of said word space marks for exposing entire words from said strip one at a time, means for projecting an optical image of each exposed word in succession onto said film, and means controlled by said recorded justifying data for controlling the relative film advance between successive words as projected onto said film to accomplish justification.

7. A photocomposing apparatus for producing a justified line of composition on a light sensitive film from an unjustified line on a record strip containing readable word images suitable for photographic reproduction in association with recorded justifying data and word space marks and having a location mark thereon in predetermined position with respect to each line of composition, comprising means controlled by said location mark on said strip for determining the proper space relation of each line of said strip with reference to said film, means responsive to the location of said word space marks for exposing entire words from said strip one at a time, means for projecting an optical image of each exposed word in succession onto said film, and means controlled by said recorded justifying data for controlling the relative film advance between successive words as projected onto said film to accomplish justification.

8. In a photocomposing apparatus for producing images of characters arranged with word spaces as an unjustified line of composition on a record strip and adapted for photographic reproduction therefrom onto a film in justified form, the combination of means for selecting a line of composition including characters having different widths and arranged in words and separated by word spaces, means including a counter for determining the width in space units of all of the characters in the line, the number of word spaces, and the number of space units to be distributed among the word spaces for justification, means controlled by said character selecting means for producing readable images suitable for photographic reproduction of the selected characters one by one in desired sequence on a record strip, means also controlled in accordance with the selection of each of said characters for effecting a relative advance of said record strip different amounts between the production of images of successive characters in accordance with the width of each said character, means actuated in response to selection of each said word space for effecting a relative advance of said record strip a uniform amount for each word space to form an unjustified readable line of composition, and means controlled by said determining means for recording on said record strip data indicative of said number of space units to be distributed among the word spaces for justifying said line of composition.

9. In a photocomposing apparatus for producing images of characters arranged with word spaces as an unjustified line of composition on a record strip and adapted for photographic reproduction therefrom onto a film in justified form, the combination of means for selecting a line of composition including characters having different widths and arranged in words and separated by word spaces, means including a counter for determining the width in space units of all of the characters in the line, the number of word spaces, and the number of space units to be distributed among the word spaces for justification, means controlled by said character selecting means for producing readable images suitable for photographic reproduction of the selected characters one by one in desired sequence on a record strip, means also controlled in accordance with the selection of each of said characters for effecting a relative advance of said record strip different amounts between the production of images of successive characters in accordance with the width of each said character, means actuated in response to selection of each said word space for effecting a relative advance of said record strip a uniform amount for each word space to form an unjustified readable line of composition, means controlled by said determining means for recording on said record strip data indicative of said number of space units to be distributed among the word spaces for justifying said line of composition, and means for marking on said record strip the location of each word space.

10. In a photocomposing apparatus for producing images of characters arranged with word spaces as an unjustified line of composition of a record strip and adapted for photographic reproduction therefrom onto a film in justified form, the combination of means for selecting a line of composition including characters having different widths arranged in words and separated by word spaces, means controlled by said character selecting means for producing readable images suitable for photographic reproduction of the selected characters in desired sequence on a record strip, means for effecting a relative advance of said record strip different amounts between the production of images of successive characters in accordance with the width of each said character, means for effecting the relative advance of said record strip a uniform amount for each word space to form an unjustified readable line of composition, means for recording data on said strip for justifying each line of composition, means for projecting images of entire words one at a time from said record strip on to a photographic film, and means controlled by said recorded data for effecting relative movement of said word images with respect to said film by controlled amounts in order to justify said line on said film.

11. In a photocomposing apparatus for producing images of characters arranged with word spaces as an unjustified line of composition on a record strip and adapted for photographic reproduction therefrom onto a film in justified form, the combination of means for selecting a line of composition including characters having different widths and arranged in words and separated by word spaces, counter means for determining the width in space units of all of the characters in the line, the number of word spaces, and the number of space units remaining for justification, means controlled by said character selecting means for producing readable images suitable for photographic reproduction of the selected characters in desired sequence on a record strip, means also controlled in accordance with the selection of each of said characters for effecting a relative advance of said record strip different amounts between the production of images of successive characters in accordance with the width of each said character, means actuated in response to selection of each said word space for effecting the relative advance of said record strip a uniform amount for each word space, means controlled by said determining means for recording on said record strip data for justifying said line of composition, means for marking on said record strip the location of each word space, means controlled by the position of successive said marks for exposing entire words on said record strip and projecting images of said entire words one at a time on to a photographic film in the form of a line of composition, and means controlled by said recorded data for effecting a relative advance of said film the proper amount between said projections of words to effect justification of said line.

12. In a photocomposing apparatus for producing images of characters arranged with word spaces as an unjustified line of composition on a record strip and adapted for photographic reproduction therefrom onto a film in justified form, the combination of means for selecting a line of composition including characters having different widths and arranged in words and separated by word spaces, counter means for determining the width in space units of all of the characters in the line, the number of word spaces, and the number of space units remaining for justification, means controlled by said character selecting means for producing readable images suitable for photographic reproduction of the selected characters in desired sequence on a record strip, means also controlled in accordance with the selection of each of said characters for effecting a relative advance of said record strip different amounts between the production of images of successive characters in accordance with the width of each said character, means actuated in response to selection of each said word space for effecting the relative advance of said record strip a uniform amount for each word space, means controlled by said determining means for recording on said record strip data identifying the space required between words to effect justification of the line, means for exposing entire words one at a time on said record strip and projecting an image thereof on to a photographic film, and means controlled by said recorded justifying data on said record strip for effecting relative movement of said word images and said film intermediate the projection of successive word images to accomplish justification of the line.

13. In a photocomposing apparatus for producing images of characters arranged with word spaces as an unjustified line of composition on a record strip and adapted for photographic reproduction therefrom onto a film in justified form, the combination of means for selecting a line of composition including characters having different widths and arranged in words and separated by word spaces, counter means for determining the width in space units of all of the characters in the line, the number of word spaces, and the number of space units remaining for justification, means controlled by said character selecting means for producing readable images suitable for photographic reproduction of the selected characters in desired sequence on a record strip, means also controlled in accordance with the selection of each of said characters for effecting the relative advance of said record strip different amounts between the production of images of successive characters in accordance with the width of each said character, means actuated in response to selection of each said word space for effecting relative advance of said record strip a uniform amount for each word space, means controlled by said determining means for recording on said record strip data identifying the space required between words to effect justification of the line, means for marking on said record strip the location of each said word space, means controlled by said location mark for exposing entire words one at a time on said record strip and projecting an image thereof on to a photographic film, and means controlled by said recorded justifying data on said record strip for effecting relative movement of said word images and said film intermediate the projection of successive word images to accomplish justification of the line.

14. In a photocomposing apparatus for producing images of characters arranged with word spaces as an unjustified line of composition on a record strip and adapted for photographic reproduction therefrom onto a film in justified form, the combination of means for selecting a line of composition including characters having different widths and arranged in words and separated by word spaces, counter means for determining the width in space units of all of the characters in the line, the number of word spaces, and the number of space units to be distributed among the word spaces for justification, means controlled by said character selecting means for producing readable images suitable for photographic reproduction of the selected characters one by one in desired sequence on a record strip, means for effecting a relative advance of said record strip different amounts between the production of images of successive characters in accordance with the width of each said character, a point set control for determining the point set of the characters in the line, means operated in accordance with said point set control for modifying the amount of said advance in accordance with the desired point set, and means controlled by said counter means for recording on said record strip data identifying the space to be provided between words to effect justification of the line.

15. In a photocomposing apparatus for producing images of characters arranged with word spaces as an unjustified line of composition on a record strip and adapted for photographic reproduction therefrom onto a film in justified form, the combination of a record strip and a film, means for producing on said record strip readable images suitable for photographic reproduction of selected characters separated by uniform word spaces to form an unjustified line of composition, means for counting the number of said word spaces, means for producing a mark on said strip at the location of each said word space, means for measuring the combined width in space units of all the characters in the line, means for subtracting said combined width count from the desired width count of a justified line of composition leaving a difference, means for dividing said difference by said number of word spaces to determine the extent of a justified word space, means for recording on said record strip in association with each line of composition thereon data for justifying said line, means controlled by said location marks for projecting images of each entire word one at a time from said record strip onto said film, means for effecting a relative advance of said film between projection of successive word images, and means controlled by said recorded data for adjusting the space between said word images to form a justified line of composition on said film.

16. In a photocomposing apparatus for producing images of characters arranged with word spaces as an unjustified line of composition on a record strip and adapted for photographic reproduction therefrom onto a film in justified form, the combination of a continuously rotating character-bearing stencil, a record strip and a film, means for flashing individual characters during rotation of said stencil and spacing said characters to produce on said record strip readable images suitable for photographic reproduction of selected characters separated by uniform word spaces to form an unjustified line of composition, means for counting the number of said word spaces, counter means for measuring the combined width in space units of all the characters in said line, means for subtracting said combined width count from the desired width count of a justified line of composition leaving a difference, means for dividing said difference by said number of word spaces to determine the extent of a justified word space, means for recording on said record strip in association with each line of composition thereon data for justifying said line, means for projecting entire word images of each said word one at a time from said record strip onto said film, means for effecting a relative advance of said film between projection of successive images, and means controlled by said recorded data for adjusting the space between said word images to form a justified line of composition on said film.

17. In a photocomposing method for producing images of characters arranged with word spaces as an unjustified readable line of composition on a record strip and adapted for photographic reproduction therefrom onto a film in justified form which includes the steps of selecting a line of composition including characters having different widths and arranged in words separated by word spaces, determining the width of all of the characters in the line, the number of word spaces, and the space remaining for justification, producing readable images suitable for photographic reproduction of the selected characters one by one in desired sequence on a record strip, effecting the relative advance of the record strip different amounts between the production of images of successive characters in accordance with the width of each character, effecting the relative advance of the record strip a uniform amount for each word space, and recording on said record strip in association with said line of composition data as determined in said determining step for controlling the amount of space to be distributed among the word spaces for justifying said line of composition.

18. In a photocomposing method for producing images of characters arranged with word spaces as an unjustified line of composition on a record strip and adapted for photographic reproduction therefrom onto a film in justified form which includes the steps of selecting a line of composition including characters having different widths and arranged in words separated by word spaces, determining the width of all of the characters in the line, the number of word spaces, and the space remaining for justification, producing readable images suitable for photographic reproduction of the selected characters in desired sequence on a record strip, effecting the relative advance of the record strip different amounts between the production of images of successive characters in accordance with the width of each character, effecting the relative advance of the record strip a uniform amount for each word space, recording on said record strip data as determined in said determining step for controlling the amount of space to be distributed among the word spaces for justifying the line of composition, and marking on the record strip the location of each word space.

19. In a photocomposing method for producing images of characters arranged with word spaces as an unjustified line of composition on a record strip and adapted for photographic reproduction therefrom onto a film in justified form which includes the steps of selecting a line of composition including characters having, different widths and arranged in words separated by word spaces, forming a position indication on a record strip at a predetermined point with respect to said line of composition, producing readable images suitable for photographic reproduction of the selected characters in desired sequence on said record strip beginning in predetermined relation to said position indication, effecting the relative advance of said record strip different amounts between the production of images of successive characters in accordance with the width of each said character, effecting the relative advance of the record strip a uniform amount for each word space, recording data on said strip for controlling the size of said word spaces to justify the line, projecting images of entire words one at a time from said record strip on to a photographic film, and effecting relative movement of said word images with respect to said film by controlled amounts under control of said recorded data in order to justify said line on said film.

20. In a photocomposing method for producing images of characters arranged with word spaces as an unjustified line of composition on a record strip and adapted for photographic reproduction therefrom onto a film in justified form which includes the steps of selecting a line of composition including characters having different widths and arranged in words separated by word spaces, determining the width of all of the haracters in the line, the number of word spaces, and the space remaining for justification, producing readable images suitable for photographic reproduction of the selected characters in desired sequence on a record strip, effecting the relative advance of the record strip different amounts between the production of images of successive characters in accordance with the width of each character, effecting the relative advance of the record strip a uniform amount for each word space to produce an unjustified line of composition on said record strip, recording on said record strip in association with said line of composition data as determined in said determining step for justifying said line of composition, projecting images of entire words one at a time from said record strip onto a film, and effecting relative advance of said film between projection of successive words under control of said recorded justifying data to produce a justified line of composition on said film.

*21. In photocomposing apparatus the combination of a continuously rotatable character carrier having characters of different widths located in different angular positions thereon, digital code data on said carrier associated with each of said characters and indicative of the relative width thereof with respect to each other, a flashing light source mounted adjacent said character carrier and adapted to produce a substantially instantaneous high intensity flash of light sufficient to illuminate a selected one of said characters, means driving said character carrier for continuous movement with respect to said light source to bring said characters successively past said light source, means cooperating with said light source to project successively the images of selected characters along a common optical path, means for mounting photosensitive material for movement past said common path to record the projected character images in succession thereon, selectively intermittently operable spacing means arranged to produce relative spacing movement between said material mounting means and said optical path to produce spacing of the recorded characters on the material in accordance with their actual widths, selector means controlling said light source and operable to perform successive illuminations of characters in accordance with a predetermined order of selection of characters to produce a line of composition, reading means cooperating with said character carrier and operative to read the relative width code data for each selected character at the time of projection of its image, and means responsive to the digital code data read by said reading means and having an output connection to said spacing means to produce spacing movement in accordance with the relative unit width of the previously projected character image.*

*22. Apparatus as defined in claim 21 wherein said spacing means includes a computer having an input connection from said code reading means and a further input variable in accordance with a selected point size for the projected characters, said computer being arranged to produce a digital output varying in accordance with the product of unit width and point size for each selected character, and a transducer responsive to the variable digital output of said computer to control accordingly the relative spacing movement for each previously projected character image.*

*23. In photocomposing apparatus the combination of a continuously rotatable character carrier having characters of different widths located in different angular positions thereon, individual digital space code data on said carrier in predetermined position with respect to each of said characters and indicative of the relative width of the associated character with respect to the other characters, drive means connected to rotate said carrier continuously during operation of said apparatus, a flashing light source mounted adjacent said character carrier and adapted to produce a substantially instantaneous flash of light sufficient to illuminate a selected one of said characters and form a stationary image thereof, means cooperating with said light source to project successively the images of individual selected characters along a common optical path and to focus said images in a common image plane, means for mounting photosensitive material in said common image plane to record the projected character images in succession thereon, selector means controlling said light source and operable to perform successive illuminations of different characters in accordance with a predetermined order of selection of characters to produce a line of composition, reading means cooperating with said character carrier to read the relative width code data for each selected character, spacing means operable to produce relative spacing movement between said material mounting means and said optical path to produce spacing of the recorded characters on the material in accordance with their actual widths, said spacing means including a computer having an input connection from said reading means and a further input variable in accordance with a selected point size of the projected characters, said computer being operable to produce an output varying in accordance with the product of unit width and point size for each selected character, and a spacing transducer responsive to the variable output of said computer to produce a corresponding variable spacing movement for each previously projected character image.*

*24. In a system for photocomposing the combination of a character carrier having characters of different widths located in different positions thereon, code data on said carrier associated with each of said characters and indicative of the relative width thereof with respect*

*to each other, a selectively controlled light source mounted adjacent said character carrier and capable of producing flashes of light illuminating selected ones of said characters in desired succession, optical means cooperating with said light source to project successively the images of selected characters along a common optical path and to focus all said images in a common image plane, means for mounting photosensitive material across said common path at said image plane to record the projected character images in succession thereon, reading means cooperating with said character carrier to read the relative width code data for each selected character, a selectively controlled pulse generator, a spacing computer including a point set counter, means for presetting said point set counter to produce an output pulse after receiving a predetermined variable number of input pulses, a space code counter connected to be preset by said reading means to produce an output pulse after receiving a variable number of input pulses in accordance with the relative space code for the selected character, circuit means connecting said point set and space code counters to receive serially pulses from said generator and connected to stop said pulse generator with an output pulse from the last of said counters to receive pulses, means forming a connection to start said pulse generator together with selection of each character, a space memory counter having an input from said pulse generator and operable to accumulate a count representative of total space allotted to each character image as determined by said spacing computer, and a spacing transducer connected to follow said memory counter and operable to produce spacing movement between said mounting means and said optical path for each character in accordance with the total space allotted thereto.*

*25. In a system for photocomposing the combination of a continuously rotatable character carrier having characters of different widths located in different positions thereon at a common radius from the axis of rotation, code data on said carrier at a different common radius and associated with each of said characters indicating the relative width thereof with respect to each other, a selectively controlled light source mounted adjacent said character carrier and capable of producing a flash of light sufficient to illuminate selected ones of said characters in desired succession and produce stationary images thereof, optical means cooperating with said light source to project successively the images of selected characters along a common optical path and to focus all images in a common image plane, means for mounting photosensitive material across said common path at said image plane to record the projected character images in succession thereon, reading means cooperating with said character carrier to read the relative width code data for a selected character at the time of illumination thereof, a selectively controlled pulse generator, a spacing computer including a point set counter having an input connection from said pulse generator, means for presetting said point set counter to produce an output pulse after receiving a predetermined variable number of input pulses, a space code counter receiving the output pulses from said point set counter and connected to be preset by said reading means to produce an output pulse after receiving a variable number of input pulses from said point set counter in accordance with the relative space code for the selected character, said space code counter being connected to stop said pulse generator with an output pulse, means forming a connection to start said pulse generator together with flashing of said light source, a space memory counter having an input from said pulse generator and operable to accumulate a count representative of total space allotted to each character image as determined by said spacing computer, and a spacing transducer connected to follow said memory counter and operable to produce intermittent spacing movement between said mounting means and said optical path after the projection of each character image.*

References Cited in the file of this patent or the original patent

UNITED STATES PATENTS

| | | |
|---|---|---|
| 1,283,394 | Bawtree | Oct. 29, 1918 |
| 1,580,115 | Brewster | Apr. 13, 1926 |
| 1,603,953 | Hunter | Oct. 19, 1926 |
| 1,732,049 | Hunter | Oct. 15, 1929 |
| 1,805,333 | Hunter | May 12, 1931 |
| 1,975,439 | Uher | Oct. 2, 1934 |
| 2,084,450 | Paris | June 22, 1937 |
| 2,098,928 | Wenczler | Nov. 9, 1937 |
| 2,160,277 | Neidich | May 30, 1939 |
| 2,207,266 | Ogden | July 9, 1940 |
| 2,388,961 | Elliott | Nov. 13, 1945 |
| 2,475,497 | Harrold | July 5, 1949 |
| 2,600,168 | Klyce | June 10, 1952 |
| 2,646,731 | Wirtz | July 28, 1953 |
| 2,652,755 | Higonnet | Sept. 22, 1953 |
| 2,682,814 | Higonnet | July 16, 1954 |
| 2,702,499 | Dyer | Feb. 22, 1955 |
| 2,714,843 | Hooven | Aug. 9, 1955 |
| 2,725,803 | Tansel | Dec. 6, 1955 |
| 2,786,400 | Peery | Mar. 26, 1957 |
| 2,876,687 | Higonnet | Mar. 10, 1959 |